US006460910B2

(12) United States Patent
Prass

(10) Patent No.: US 6,460,910 B2
(45) Date of Patent: Oct. 8, 2002

(54) DEVICE FOR TESTING EMERGENCY ILLUMINATION AND DETECTION EQUIPMENT

(76) Inventor: Jeffrey George Prass, 109 Deer Trail Dr., Springboro, OH (US) 45066

( * ) Notice: Subject to any disclaimer, the term of this patent is extended or adjusted under 35 U.S.C. 154(b) by 0 days.

(21) Appl. No.: 09/781,633

(22) Filed: Feb. 12, 2001

(65) Prior Publication Data

US 2001/0048229 A1 Dec. 6, 2001

Related U.S. Application Data

(60) Provisional application No. 60/183,887, filed on Feb. 22, 2000.

(51) Int. Cl.[7] .................................................. B25J 1/04

(52) U.S. Cl. ......................... 294/24; 200/331; 294/19.1

(58) Field of Search ............................ 294/2, 19.1, 22, 294/23, 24, 26; 7/167, 170; 81/15.9, 484, 488; 200/330, 331

(56) References Cited

U.S. PATENT DOCUMENTS 3,360,291 A * 12/1967 Barrett ...................... 294/19.1
3,936,088 A * 2/1976 Williams ................... 294/19.1
4,422,682 A * 12/1983 O'Connell ................. 294/19.1
4,622,868 A * 11/1986 Flannigan ................. 294/24 X
4,726,263 A * 2/1988 Lake ...................... 294/19.1 X
4,899,050 A * 2/1990 Cianflone .............. 294/19.1 X
5,016,504 A * 5/1991 Brunetto et al. ....... 294/19.1 X
5,951,074 A * 9/1999 Guzzi et al. ............... 294/19.1
6,242,704 B1 * 6/2001 Ambrose et al. ...... 294/19.1 X

* cited by examiner

*Primary Examiner*—Johnny D. Cherry

(57) ABSTRACT

A testing tool having a handle with an attached tool head. The tool head has a branch rising upward from the handle and two branches extending perpendicularly from the handle. The perpendicular branches contain specific features that allow for the tool to be used in a more efficient manner. The tool head extends upward from the perpendicular branches and curves in a 90-degree manner outward from the perpendicular branches. The curved branch contains a raised square area on the end of the curved section. The raised section contains a tapered object that tapers in circumference from the top (wider) through the raised section to the bottom (narrower) of the raised area. The tool can be used with or without an extendable assembly as needed to perform the specified functions.

4 Claims, 8 Drawing Sheets

DEVICE FOR TESTING EMERGENCY ILLUMINATION AND DETECTION EQUIPMENT

CROSS-REFERENCES TO RELATED APPLICATIONS

This application claims priority from U.S. provisional application Ser. No. 60/183,887, filed Feb. 22, 2000.

STATEMENT REGARDING FEDERALLY SPONSORED RESEARCH OR DEVELOPMENT

Not Applicable

REFERENCE TO A MICROFICHE APPENDIX

Not Applicable

BACKGROUND OF THE INVENTION

1. Field of the Invention

This invention is directed toward a tool that can test the operation of electrical or battery powered emergency devices.

The invention is more particularly directed toward a testing tool that effectively, manually activates test switches and/or test buttons on devices including but not limited to emergency exit luminare, emergency exit signs, smoke detector devices, carbon monoxide detectors and any other device with a manually activated test switch and/or test button. The claimed invention may be combined with an extendable or articulating assembly for more efficient use.

2. Description of the Related Art

Prior art related to the invention claimed includes devices that test emergency illumination devices through an electrical monitoring apparatus. Examples of such devices are shown in U.S. Pat. No. 5,811,975. These devices require the use of computers to monitor the operation and backup status of emergency illumination devices, which involve expensive retrofitting of intact electrical systems in a particular occupancy. These devices rely solely on the ability of a computer to ensure the safety of the occupants of the building, which may be compromised in the event of electrical failure. The claimed invention enables an inspector and/or technician to test each device manually for emergency readiness. The ability of the inspector and/or technician to manually activate and visually observe the device activating or failing to activate will provide an eyewitness test of the backup lighting system.

Prior art also includes devices that test smoke detector devices by using smoke or an aerosol substance as shown in U.S. Pat. No. 4,271,693. Such devices test the detector's ability to activate by chemical or artificial means with each device only testing a single function and/or a single type device. The claimed invention allows multiple emergency devices and multiple types of emergency devices to be tested rapidly using a single apparatus. This rapid testing will allow the inspector and/or technician to be more productive because it eliminates the requirement of multiple tools and/or multiple testing devices.

Makeshift devices have been used to activate test switches and/or test buttons. These makeshift devices include but are not limited to broom handles, yard sticks, ink pens and clip boards, and may require the inspector and/or technician to climb onto ladders, chairs or boxes. These makeshift devices made testing of the emergency devices inefficient and difficult. Makeshift devices may slip off a test button and are ineffective when pulling the test switch in a downward motion. In addition, the test switch or test button may be simply out of reach to the inspector and/or technician. The claimed invention improves the ability of the inspector and/or technician to activate the test switch and test button, and when combined with an extendable assembly as shown in U.S. Pat. No. 5,220,707, allows the user to test the emergency illumination device without the use of a ladder or makeshift climbing device, thus improving the safety of the inspector and/or technician.

It will become evident to the reader that the design of the claimed invention allows the inspector and/or technician to more effectively test emergency illumination and detection devices with increased productivity and personal safety.

BRIEF SUMMARY OF THE INVENTION

To overcome limitations in the prior art and to overcome inadequacies in makeshift devices, the claimed invention permits rapid, efficient, and safer testing of emergency detection and illuminated devices.

Current fire codes require inspections of structures to ensure the safety of its occupants during emergency situations. Included in these inspections is the activation of emergency lights, exit lights, smoke detectors and associated battery backup components. The claimed invention allows for rapid activation of these lights and detector devices.

Multiple manufacturer of emergency lights, exit lights and detection devices have produced a variety of activation switches and buttons. The types of switches and buttons include but are not limited to pull down/push up types, toggle types and push in types. Some switches are recessed into the case that holds and supports the lights and detectors, making activation of the test buttons/switches even more difficult with the use of the devices referred to in prior art. Many lights and detection devices are mounted above doorways or in other out-of-reach locations for the inspector and/or technician who is responsible for testing said devices. When combined with an extendable or articulating assembly, the invention allows the devices to be tested, in many cases without the use of a ladder, thus making the testing procedure safer and less time consuming.

The claimed invention consists of a tool head with various projections and characteristics. These projections allow many different types of switches and buttons to be activated. The tool head extends upward away from the extendable assembly in a tapering manner to permit more efficient use of the tool head. The tool head is designed with a universal thread inside the base to permit removal of the tool head from the extendable assembly for transport and storage.

The extendable assembly is designed to be used with the tool head attached to test buttons or switches that are out of reach without the use of a ladder or makeshift elevation device. The tool head has a projection that extends upward. The upward extending projection is at a 90 degree angle from the base. The 90-degree projection is designed to activate the described switches and buttons without the tool base coming in contact with the device to be tested. The 90-degree top projection has an increased thickness on the projection distal to the 90-degree curve. In the middle of the top projection, a conical figure extends above and below the increased thickness in a tapering manner from wide to narrow towards the tool base. This conical figure is designed to activate test switches and buttons that are recessed into the case of the device and on top of the device to be tested. The tool head also contains two projections that extend perpendicular to the base, midway between the tool base and the upper projection. The two middle perpendicular projections are designed to pull down, push up or push in test switches and buttons. The two perpendicular projections have specific features. One side of the projection is tapered on both top and bottom edges to allow the activation of test switches and buttons that are recessed into the device's holding case, and an indented area proximal to the base permits the test switch or button to be activated in a pull down motion. The other side of the perpendicular projection has an angled edge on the distal end which permits toggle type switches to be activated, and an indented area distal to the base permits the test switch or button to be activated in a push up motion.

DETAILED DESCRIPTION OF THE INVENTION

Figure 1:
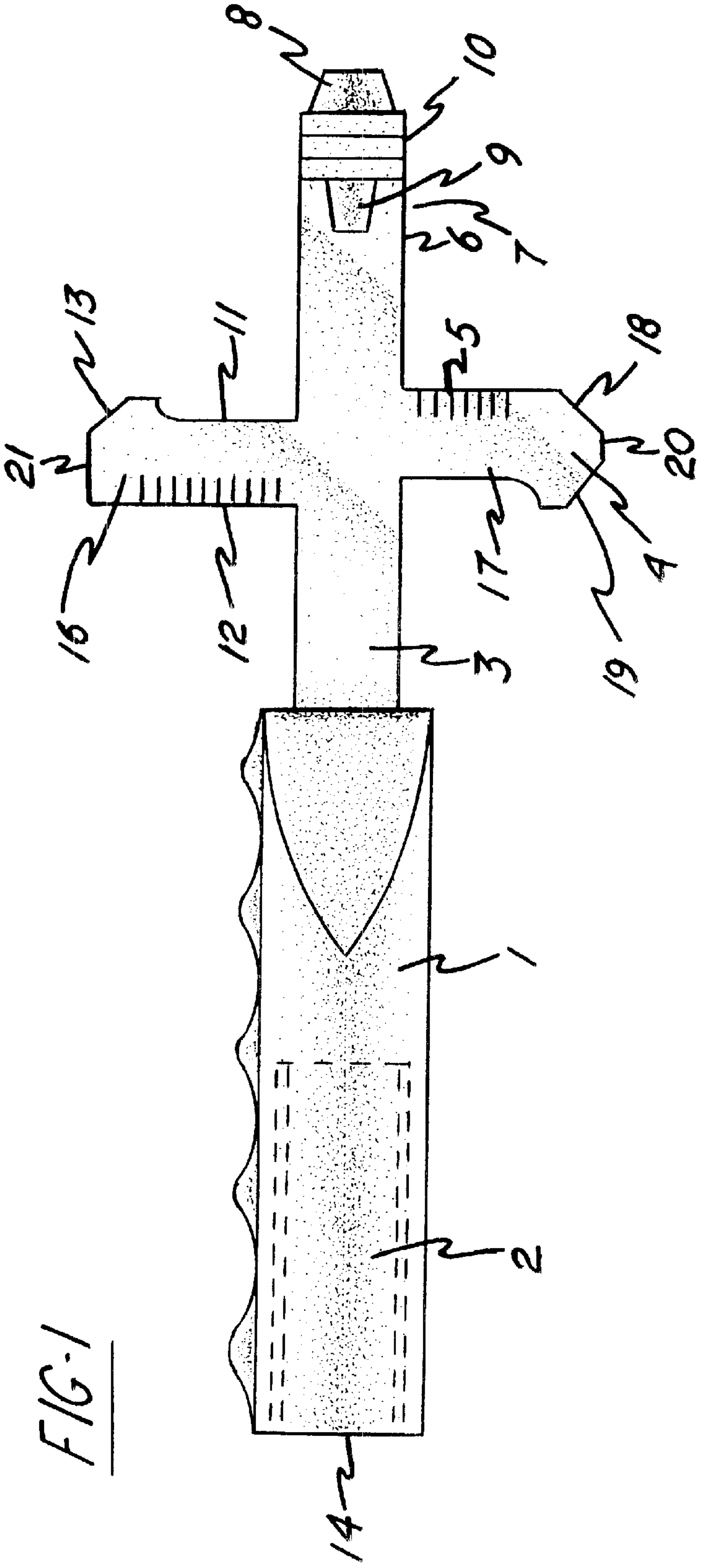
FIG. 1 is a frontal view of the tool head and the tool base.
Figure 2:
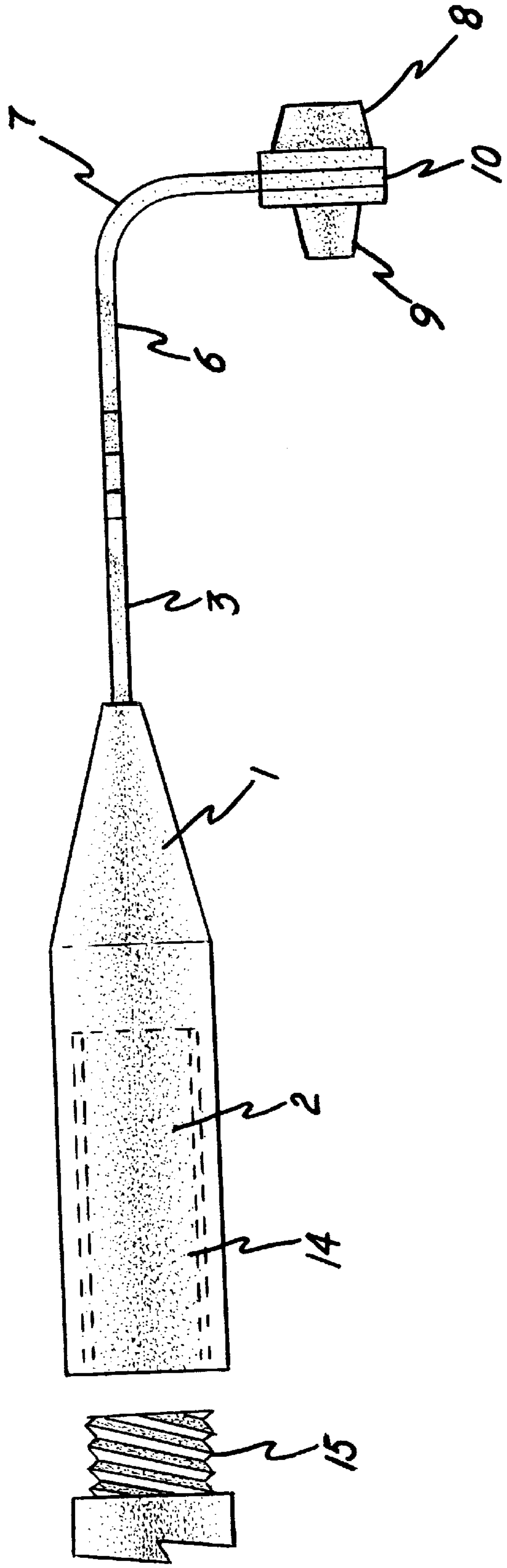
FIG. 2 is a side view of the tool head and the tool base.
Figure 3:
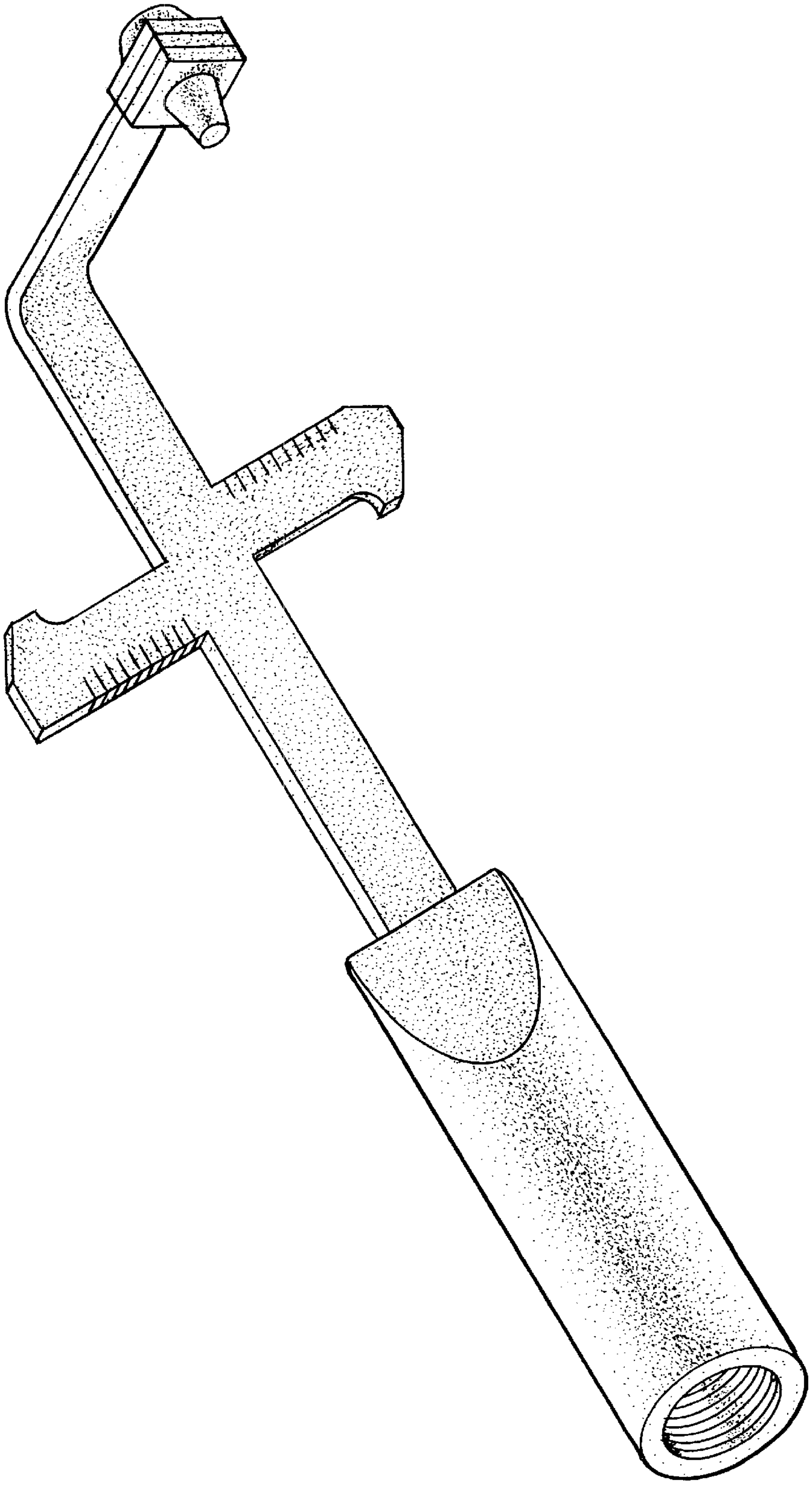
FIG. 3 is a perspective view of the tool head and the tool base.

Referring now to the drawings in detail, the reader will appreciate that the disclosed invention contains a simple and neat tool assembly 1, comprising a base 2 with a threaded portion 14, designed with a specific thread size and pitch to facilitate the connection of an extendable assembly 15 to form a usable and practical tool assembly.

Figure 4:
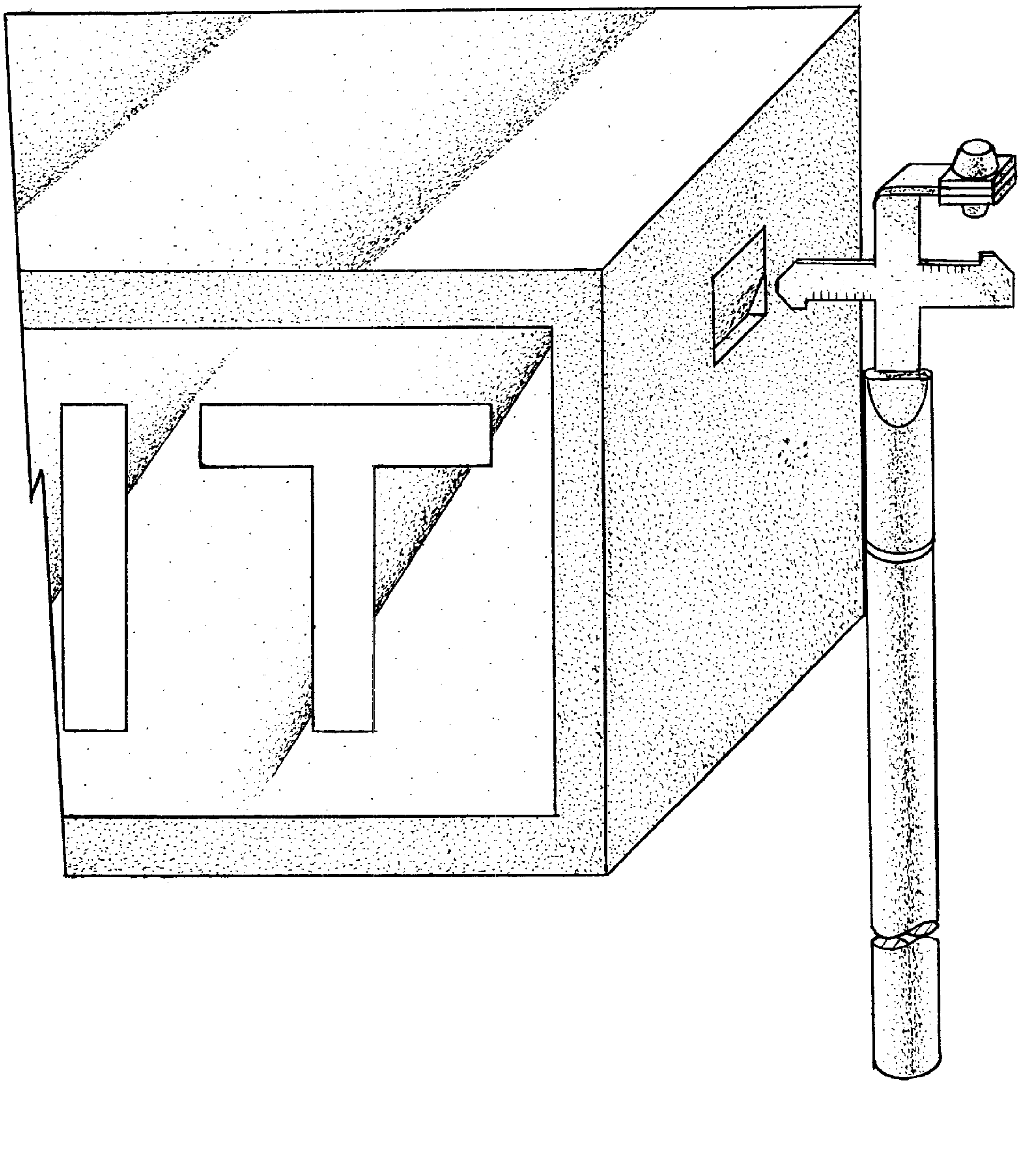
FIG. 4 is a view of the tool head and tool base attached to an extendable assembly activating a toggle type test switch on an exit light.
Figure 5:
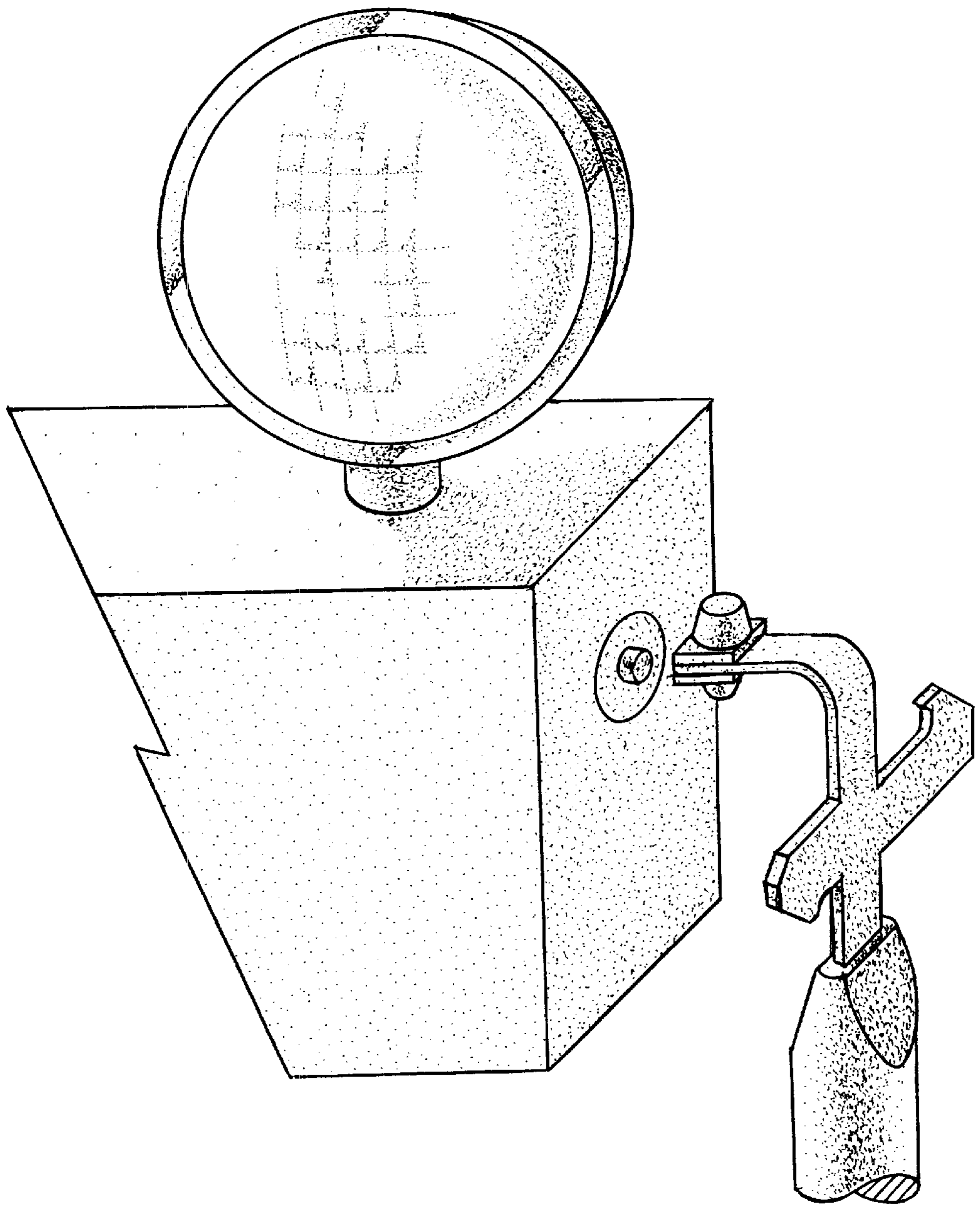
FIG. 5 is a view of the tool head and tool base activating a push in type test switch or button on an emergency egress light.
Figure 6:
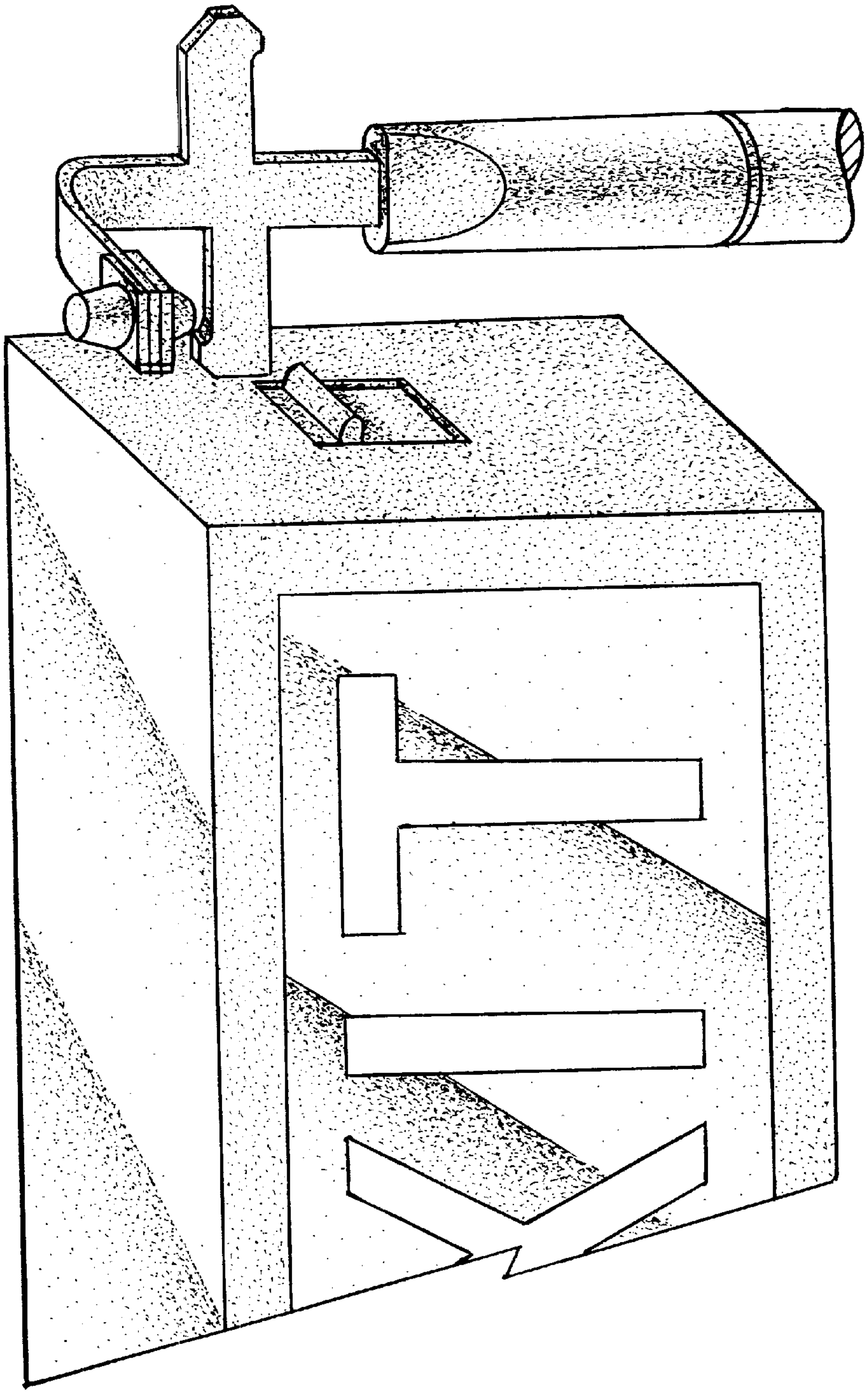
FIG. 6 is a view of the tool head and tool base, attached to an extendable assembly, activating a pull down push up type test switch or button on an exit light.

As seen in FIG. 1, the base 2 extends upward through a gradually narrowing tool head 3. Distal to the tool head exists two perpendicular tool branches 4 and 16, extending outward from the tool head 3 at equal distances from the center of the tool base 2. The branches 4 and 16 have specific features that allow the tool head 3 to be used in an efficient and effective manner to perform the functions revealed in FIG. 4 through FIG. 8. The perpendicular branch 4 contains a section 5 of small indentions across the surface to facilitate the effects of friction to aid in the function of the tool to push up on test switches and buttons. Also on the side proximal to the tool base 1 on the perpendicular branch 4 exists a section of indented proportion 17 that restricts movement side-to-side of test switches and buttons to be activated. On the distal end of tool branch 4 exists two angled areas 18 and 19 tapering to a reduced area 20 to aid in the function of the tool head to activate test switches and buttons as illustrated in FIG. 4. The perpendicular branch 16 contains a section 12 of small indentions across the surface to facilitate the effects of friction to aid in the function of the tool to pull down on test switches or buttons. Also on the side proximal to the tool base 1 on the perpendicular branch 16 exists a section of indented proportion 11 that restricts movement side-to-side of test switches and buttons to be activated. On the distal end of tool branch 16 exists an angled area 13 tapering to a reduced area 21 to aid in the function of the tool head to activate test switches and buttons as shown in FIG. 6.

The tool head 3 extends upward distally from the perpendicular branches 4 and 16 and curves in a 90-degree manner distal to portion 6. At the curved tool head 7, the tool head expands in depth at portion 10. The expansion of depth 10 will have a material to provide the effects of friction to further facilitate activation of test switches and buttons. In the center portion of the expanded depth of the tool head and distal to the curved portion 7, exists a conical portion located centrally in expanded portion 10 at the top of tool head 3. The conical portion contains a top portion 8 larger in circumference tapering through the depth of portion 10 to a conical FIG. 9 slightly smaller in circumference than portion 8. Both portions 8 and 9 can be used to activate test switches and buttons that may be readily accessible on the bottom portion of a device as well as switches and buttons that are indented in the container of an emergency device or on the top portion of the emergency device. Further, the expanded portion 10 is of shape of equal measure on all four sides.

The extendable assembly 15 may be of any type of articulating device currently and commonly in use. This allows the user of the claimed invention the freedom of options as to the desired length, construction and use of the tool head with tool base to achieve the desired use of the claimed invention.

While there are numerous optional embodiments of the disclosed tool assembly, applicant has constructed a preferred embodiment comprising two different parts, namely the tool base 2 and the tool head 3, made out of malleable steel or aluminum. The steel or aluminum tool head may be covered with a durable coating such as rubber to prevent rust and general material degradation. The tool base 2 may be constructed of a thermoplastic through techniques common to the plastic industry and connected to tool head 3 using common fasteners, rivets or threaded bolts and nuts or be connected using thermal or chemical materials bonding the two parts.

The tool base 2 and the tool head 3 may be constructed into one assembly of malleable steel, aluminum or thermoplastic. The top of the tool head has a portion of increased depth 10 with the conical tapered portions 8 and 9 constructed of a durable rubber or plastic material to facilitate the needed flexibility for use. The portion 10 is to contain on three sides a material that facilitates the effects of friction to improve the effectiveness of the tool's function.

Figure 7:
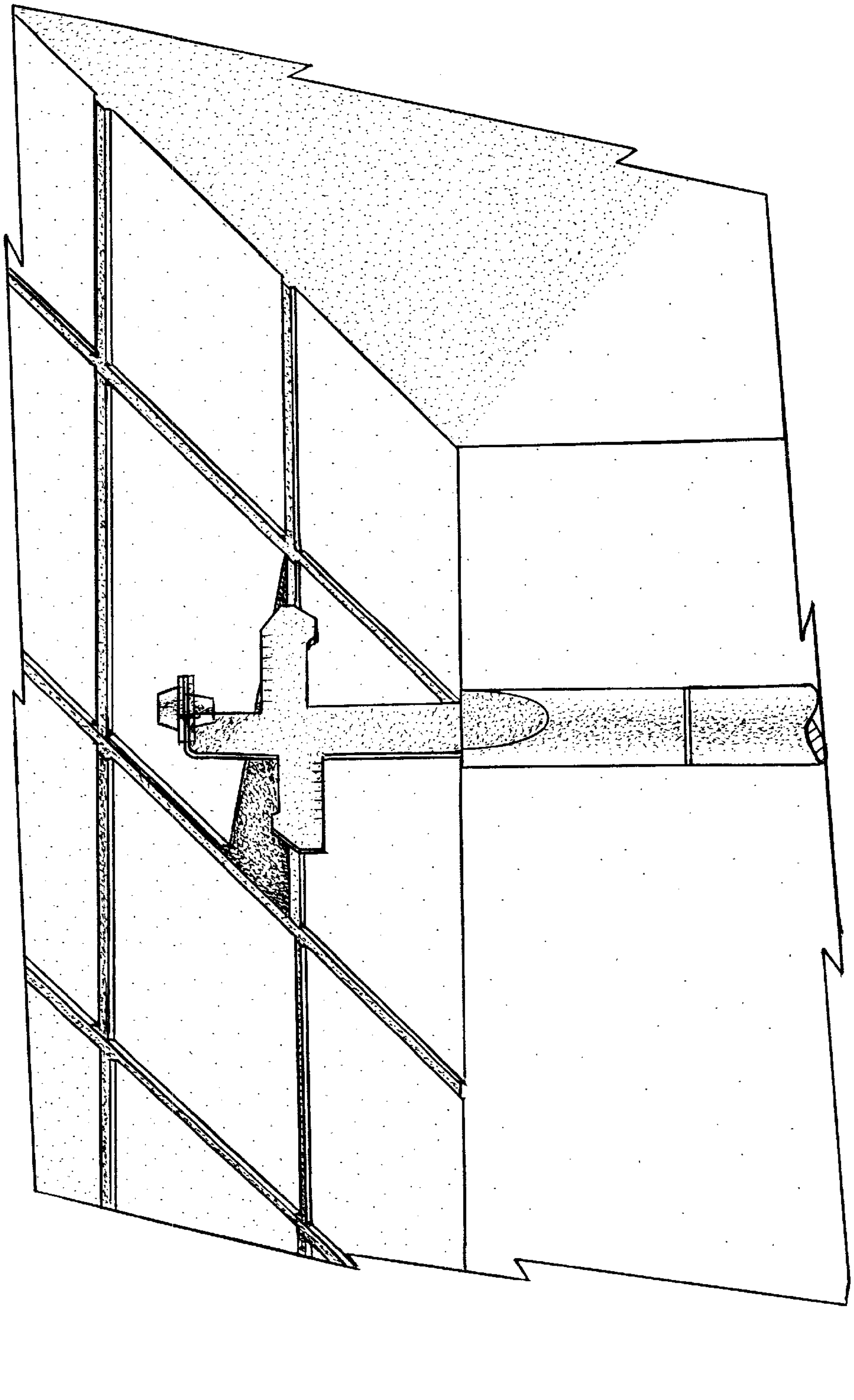
FIG. 7 is a view of the tool head and tool base attached to an extendable assembly, displacing ceiling material for inspection of a void area.
Figure 8:
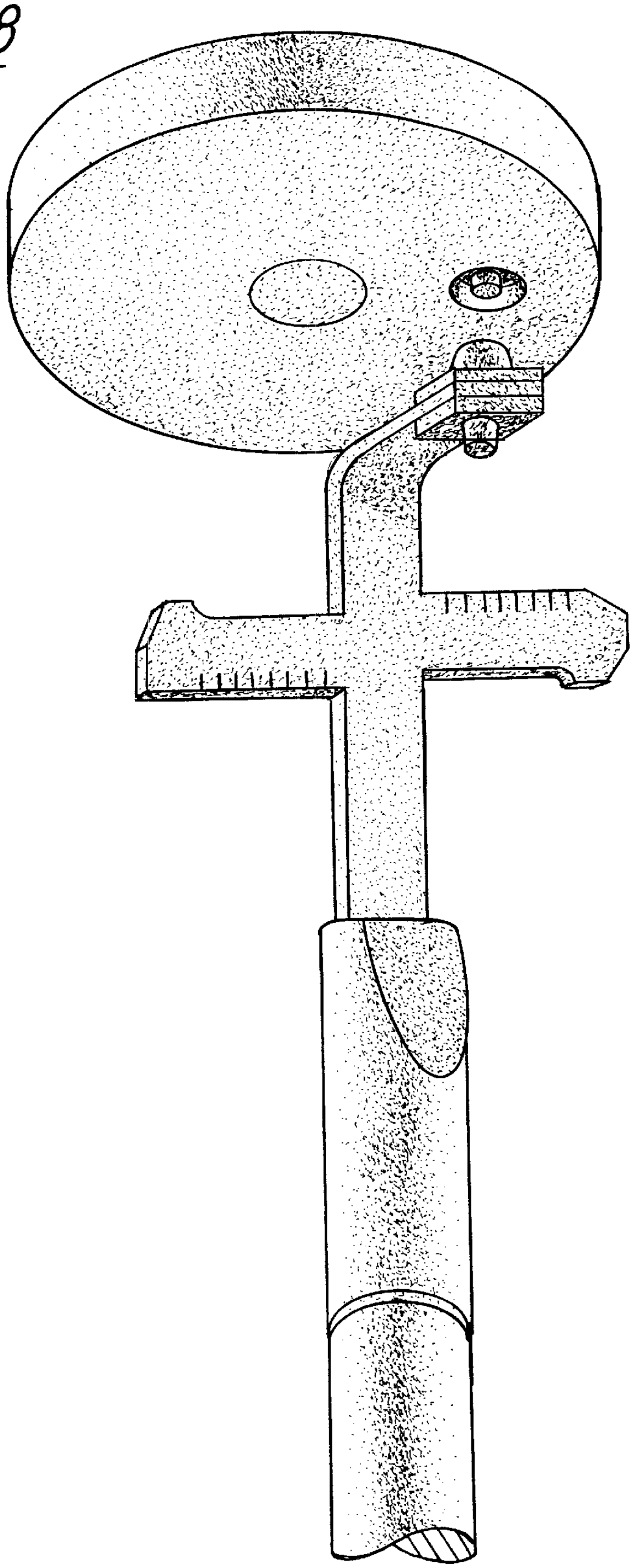
FIG. 8 is a view of the tool head and tool base attached to an extendable assembly, activating a test button on an emergency detection device.

While the tool has been referred to as a device to activate test switches and buttons on emergency devices, it can also be used in other applications such as displacing ceiling materials for the inspection of void areas in structures as shown in FIG. 7. Its use for other functions is determined by the desire of the user. Although it is recommended that the tool head and tool base be used with an extendable assembly, the use of the tool head with the tool base is effective in situations where the device to be tested is within the reach of the inspector and/or technician who are testing the device. It will be obvious to those skilled in the art that various changes may be made to the disclosed tool head and base without departing from the scope of the invention, which is not to be considered as being limited to what is shown in the drawings and described in the specification.

What I claim as my invention is:

1. A testing tool having a threaded base with a specific thread pitch and size to facilitate the attachment of an extendable assembly, the base extending upward to a gradually narrowing tool head, whereas the tool head extends beyond the threaded base to two perpendicular branches: one branch containing a tapered portion to approximately half the width of the branch and an indented portion on the branch distal to the tool head and distal to the tool base with a section of small indentions on the branch proximal to the tool base, the other perpendicular branch containing two gradually tapering sections on both the top and bottom of the distal end of the perpendicular branch combining to form a small flat section of surface and an indented portion on the branch distal to the tool head and proximal to the tool base, a section of small indentions on the branch distal to the tool head and distal to the tool base, extending distally from the perpendicular branches and the threaded base exists a raised section curved at a 90 degree angle in relation to the perpendicular branches, at the distal end of the curved section exists an area of increased depth with a conical portion extending above, through and below the raised area in a gradually tapering manner from wide to narrow downward towards the perpendicular branches.

2. A tool as claimed in claim 1 wherein the tool head and the tool base may be constructed into one combined tool head, of uniform construction.

3. A tool as claimed in claim 1 wherein the tool may be used with or without an extendable assembly attached to the tool base.

4. A tool as claimed in claim 1 wherein the tool base contains indentations to facilitate the user to handle the base in an ergonomically effective manner.

* * * * *